United States Patent [19]

Leimer et al.

[11] Patent Number: 5,013,455

[45] Date of Patent: May 7, 1991

[54] PROCESS FOR ENHANCING THE FILTERABILITY OF ORGANIC PIGMENTS

[75] Inventors: Marius Leimer, Riehen; Jost von der Crone, Arconciel, both of Switzerland; Fridolin Bäbler, Hoctessin, Del.; Heinz Neuschütz, Rheinfelden, Fed. Rep. of Germany

[73] Assignee: Ciba-Geigy Corporation, Ardsley, N.Y.

[21] Appl. No.: 588,404

[22] Filed: Sep. 26, 1990

[30] Foreign Application Priority Data

Oct. 4, 1989 [CH] Switzerland .......................... 3629/89

[51] Int. Cl.$^5$ ............................................. B01D 37/02
[52] U.S. Cl. ..................... 210/729; 210/778; 106/493
[58] Field of Search ............... 210/698, 727, 728, 729, 210/778; 106/493

[56] References Cited

U.S. PATENT DOCUMENTS 4,810,390  3/1989  Flierl et al. .................. 210/772

*Primary Examiner*—Stanley Silverman
*Assistant Examiner*—Neil M. McCarthy
*Attorney, Agent, or Firm*—JoAnn Villamizar

[57] ABSTRACT

A process for enhancing the filterability of organic pigments, which comprises adding to an aqueous pigment suspension 0.5 to 15% by weight, based on the pigment, of an unbranched aliphatic 1,2-dihydroxy compound containing 8 to 22 carbon atoms, and stirring the mixture for at least 15 minutes in the temperature range from 20° to 100° C.

Pigments treated by the process of this invention have substantially enhanced filterability as compared with identical pigments which have not been treated with the 1,2-dihydroxy compound.

8 Claims, No Drawings

PROCESS FOR ENHANCING THE FILTERABILITY OF ORGANIC PIGMENTS

The present invention relates to a process for enhancing the filterability of organic pigments by treating the pigment suspension with an aliphatic 1,2-diol.

The filtration of pigment suspensions, especially in finely particulate form, is often problematical. Such pigment suspensions cannot be processed in a satisfactory manner on a large scale—if indeed at all—with the aid of conventional filtration apparatus such as vacuum drum filters, separators or filter presses. Lengthy filtration and washing times are necessary. Products of insufficient chemical purity are often obtained on account of incomplete washing off. In addition, the isolated pigments are frequently so damaged in respect of their properties, especially because of agglomeration of the pigment particles, that they cannot be used direct for the coloration of high molecular weight organic materials owing to their insufficient dispersibility and/or coloristic properties. Furthermore, the reproducibility is usually unsatisfactory when using such filtration apparatus for working up fine pigment suspensions.

For processing different suspensions of solids in liquids it has already been proposed to use the membrane separation technique described, for example, in the general surveys published in "Farbe und Lack" 90, 5/1984, pp. 372-374, and "Chem.-Ing.-Tech". 53 (1981), No. 4, pp. 227-236 and, in particular, in U.S. Pat. No. 4,810,390. In this technique, semipermeable layers in the form of membranes are used to separate the filtrate (often called the permeate) from the suspended solid. The semipermeable membrane is permeable to the liquid, for example water, whereas it retains the undissolved solids.

It has now been found that by treating an aqueous pigment suspension with a minor amount of an aliphatic 1,2-diol, the pigments can, surprisingly, be filtered and washed more rapidly and easily.

Aftertreatments of pigments with 1,2-diols are already known from GB patent 1 395 700 and EP patent application 101 666. In both these publications, however, the aftertreatment consists of a conditioning of already isolated pigments for enhancing their rheology and dispersibility. In the first publication, the procedure comprises treating preferably inorganic pigment particles which have already been coated by conventional methods with a 1,2-diol. In the second publication, organic pigments are subjected to aqueous milling using a 1,2-diol as milling auxiliary.

Accordingly, the present invention relates to a process for enhancing the filterability of organic pigments, which comprises adding to an aqueous pigment suspension 0.5 to 15% by weight, based on the pigment, of an unbranched aliphatic 1,2-dihydroxy compound containing 8 to 22 carbon atoms, and stirring the mixture for at least 15 minutes in the temperature range from 20° to 100° C.

Typical examples of suitable 1,2-dihydroxy compounds are: 1,2-octanediol, 1,2-nonanediol, 1,2-decanediol, 1,2-undecanediol, 1,2-dodecanediol, 1,2-tridecanediol, 1,2-tetradecanediol, 1,2-pentadecanediol, 1,2-hexadecanediol, 1,2-heptadecanediol, 1,2-octadecanediol, 1,2-nonadecanediol, 1,2-eicosanediol, 1,2-heneicosanediol, 1,2-docosanediol, singly or in mixtures.

In the process of this invention it is preferred to use aliphatic 1,2-dihydroxy compounds containing 10 to 16 carbon atoms. It is particularly preferred to use 1,2-decanediol, 1,2-hexadecanediol and, most preferably, 1,2-dodecanediol.

The 1,2-dihydroxy compounds are preferably used in amounts of 1 to 5% by weight, based on the pigment.

Exemplary of organic pigments which can be treated by the process of this invention are pigments of the perylene, pyrrolopyrrole, perinone, quinacridone, quinophthalone, isoindolinone, isoindoline, dioxazine, anthraquinone, thioindigo, azo, methine or azomethine series and salts thereof. Suitable pigments of the methine or azomethine series are the metal-free pigments as well as the metal complexes. It is also possible to use pigment mixtures. Particularly suitable for the treatment of the process of this invention are the pigments of the anthraquinone series, especially 4,4'-diamino-1,1'-dianthraquinonyl, as well as the metal and ammonium salts of the disazo and, in particular, monoazo pigments disclosed in German Offenlegungsschrift specifications 2 616 981 and 3 318 073, and in EP patent applications 73 972 and 241 413.

The addition of the diol is conveniently made immediately after completion of the pigment synthesis or after a preliminary filtration after suspending the filter cake in water.

It is preferred to stir the suspension with the diol for 30 minutes to 4 hours in the temperature range from 50° to 100° C.

Even if the pigment suspension is normally neutral, it may in certain cases be advantageous to adjust the pH to the acid or alkaline range.

The process of this invention is normally carried out in the absence of organic solvents. Minor amounts thereof may, however, be tolerated, provided they do not interfere with the process.

Processing can be effected in known manner by filtering the pigment suspension and washing and drying the filter cake. The 1,2-dihydroxy compounds can be removed by washing the filter cake with an organic solvent such as methanol. Even though not necessary, it may be expedient—depending on the pigment and the end use—to leave the 1,2-dihydroxy compounds in the pigment or pigment mixture.

The 1,2-dihydroxy compounds act in turn as texture improvers and are able to prevent a reagglomeration of the pigment particles in the further processing. At all events, the presence of a 1,2-dihydroxy compound in the pigment or pigment mixture has a beneficial influence on the dispersibility of the pigment. Conventional apparatus such as vacuum or circulating air driers, paddle driers fluidised bed or freeze driers or spray driers are suitable for drying the pigments.

If the 1,2-dihydroxy compound remains in the pigment or pigment mixture, then an excellent compatibility of the 1,2-dihydroxy compound with the substrate to be coloured is observed, irrespective of the amount of said compound. The properties of the pigmented substrate, such as fastness to heat, weathering, light and migration, are not impaired.

The process of this invention effects not only an enhancement of the filterability and washing off of the treated pigments as already mentioned, but also of their suitability for spray drying. The flowability of the pigment suspension, the stirrability, pH adjustment and reproducibility of the pigment quality are beneficially influenced thereby.

The pigments treated in the process of this invention have, moreover, excellent rheological behaviour and very good dispersibility. Their normal properties such as colour strength, and fastness to light, weathering, heat and migration, are not impaired by the process of this invention. The good rheological behaviour has useful consequences in particular in the production of paints with high pigment loading. No change in viscosity is observed during the storage of such paints. For incorporation in plastics, it is generally important that the pigments can be readily dispersed without additional shear forces being exerted.

The pigments treated in the process of this invention are suitable for pigmenting high molecular weight organic material, for example cellulose ethers and esters such as ethyl cellulose, acetyl cellulose, nitrocellulose, polyamides and polyurethanes or polyesters, natural resins or synthetic resins, especially urea/formaldehyde and melamine/formaldehyde resins, alkyd resins, phenolic plastics, polycarbonates, polyolefins such as polyethylene, polypropylene and polystyrene, polyvinyl chloride, polyacrylonitrile, polyacrylates, fluorinated polymers such as polyfluoroethylene, polytrifluorochloroethylene or tetrafluoroethylene/hexafluoropropylene copolymer, and also thermoplastic or curable acrylic resins, rubber, casein, silicone and silicone resins, singly or in mixtures. These high molecular weight compounds may be in the form of plastics, melts or spinning solutions, paints or printing inks. Depending on the envisaged end use, it is convenient to use the pigments as toners or in the form of preparations.

The invention is illustrated by the following Examples.

EXAMPLE 1

30 g of 4,4'-diamino-1,1'-dianthraquinonyl (C.I. Pigment Red 177), obtained by desulfonation of 4,4'-diamino-1,1'-dianthraquinonyl-3,3'-disulfonic acid in 80% sulfuric acid at 135°-140° C. in accordance with Example 1 of German Offenlegungsschrift 1 205 215, are suspended as moist filter cake (100-150 g) for about 8 hours in 185 ml of water. The pH of the suspension is adjusted to 2 and the volume is bulked with water to 500 ml. After warming to 40° C., a suspension of 0.6 g of 1,2-dodecanediol in 60 ml of water is added. After initially heating to 65°-70° C. with good stirring, whereupon the viscous suspension gradually becomes more fluid, stirring is continued for 2 hours at 96° C. The suspension is then diluted with 400 ml of water and filtered. The filter cake is dried under vacuum at 75° C. or spray dried, to give 30 g of the pigment of formula

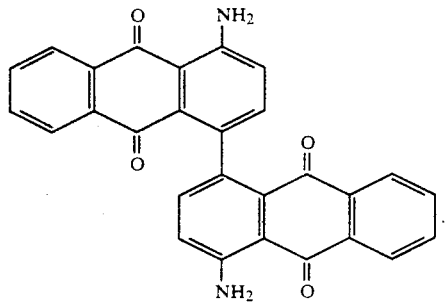

Compared with the identical pigment which has not been treated with diol, the product obtained in this Example can be filtered and washed much more rapidly and its suitability for spray drying is much greater. The rheological behaviour in paints is excellent and the finishes obtained have excellent transparency.

Pigments which can be more rapidly filtered and more readily washed than untreated pigments are obtained by replacing 1.2 g of dodecanediol with the same amount of the following diols:
1,2-octanediol,
1,2-tetradecanediol,
1,2-hexadecanediol.

EXAMPLE 2

13 g of 93% 2-amino-4,5-dichlorobenzenesulfonic acid are dissolved in 90 ml of deionised water and 5.7 ml of 25% ammonia solution. To the clear reddish violet solution are added 27.5 ml of 23.5% hydrochloric acid. The resultant white, dense slurry is then cooled to 5° C. and to it are added 12.5 ml of 4N sodium nitrite solution over 5 minutes. Then 15.5 g of 90% 1-(3-sulfophenyl)-3-methyl-5-pyrazolone in the form of a fine suspension in 100 ml of deionised water are added dropwise. The pH of the pale yellow suspension is adjusted to 6.5 with 15.5 ml of 25% ammonia solution. The now orange suspension is stirred for 3 hours, the temperature rising from 5° C. to 22° C. When the coupling is complete, this suspension is heated to 80° C., 1.2 g of 1,2-dodecanediol (as suspension in 120 ml of water) are added, and stirring is continued at 80° C. for 2 hours. The suspension is filtered at 50° C. and the filter cake is washed with a small amount of water and dried under vacuum at 60° C., to give 26.4 g of an orange pigment of formula

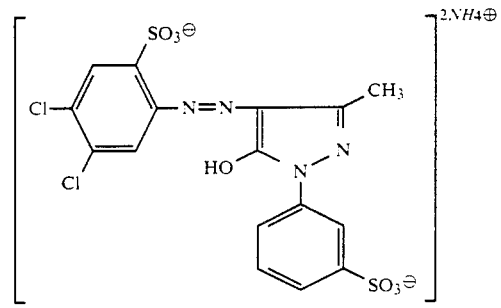

in powder form.

Compared with the identical pigment which has not been treated with diol, the product obtained in this Example can be filtered much more rapidly. In addition, the residual ammonium chloride in the filter cake can be washed out more completely. The dispersibility of the treated pigment in plastics is also better as compared with the untreated pigment.

What is claimed is:

1. A process for enhancing the filterability of organic pigments, which comprises adding to an aqueous pigment suspension 0.5 to 15% by weight, based on the pigment, of an unbranched aliphatic 1,2-dihydroxy compound containing 8 to 22 carbon atoms; stirring the mixture for at least 15 minutes in the temperature range from 20° to 100° C.; and, filtering the mixture to recover the organic pigments.

2. A process according to claim 1, which comprises using a 1,2-dihydroxy compound containing 10 to 16 carbon atoms.

3. A process according to claim 1, wherein the 1,2-dihydroxy compound is used in an amount of 1 to 5% by weight, based on the pigment.

4. A process according to claim 1, wherein the aqueous pigment suspension is stirred with the 1,2-dihydroxy compound for 30 minutes to 4 hours in the temperature range from 50° to 100° C.

5. A process according to claim 1, wherein the organic pigment is selected from the group consisting of the perylene, pyrrolopyrrole, perinone, quinacridone, quinophthalone, isoindolinone, isoindoline, dioxazine, anthraquinone, thioindigo, azo, methine or azomethine series and salts thereof.

6. A process according to claim 1, wherein the organic pigment is a pigment of the anthraquinone series or is a metal salt or ammonium salt of a disazo or monoazo pigment.

7. A process according to claim 1, wherein the organic pigment is 4,4'-diamino-1,1'-dianthraquinonyl.

8. A process according to claim 7, wherein the dihydroxy compound is 1,2-dodecanediol.

* * * * *